(No Model.)

W. H. BOMM.
FASTENING DEVICE.

No. 589,333. Patented Aug. 31, 1897.

FIG. 1.

FIG. 2.

WITNESSES:
John Buckler
C. Gerih

INVENTOR
William H. Bomm
BY
Edgar Tate & Co.
ATTORNEYS.

UNITED STATES PATENT OFFICE.

WILLIAM H. BOMM, OF WESTWOOD, NEW JERSEY.

FASTENING DEVICE.

SPECIFICATION forming part of Letters Patent No. 589,333, dated August 31, 1897.

Application filed June 11, 1897. Serial No. 640,345. (No model.)

*To all whom it may concern:*

Be it known that I, WILLIAM H. BOMM, a citizen of the United States, residing at Westwood, in the county of Bergen and State of New Jersey, have invented certain new and useful Improvements in Fastening Devices, of which the following is a full and complete specification, such as will enable those skilled in the art to which it appertains to make and use the same.

This invention relates to fastening devices for use in connection with lines, ropes, cables, and for similar purposes; and the object thereof is to provide an improved device of this class by means of which the separate ends of a line, rope, or cable may be quickly, easily, and securely connected and held and as easily disconnected when desired, a further object being to provide a fastening device of this class which is particularly adapted for use in connection with clothes-lines and other lines of this class which are usually mounted on pulleys or similar supports.

The invention is fully disclosed in the following specification, of which the accompanying drawings form a part, in which—

Figure 1 is a plan view of my improved fastening device, and Fig. 2 a central longitudinal section thereof and showing the method of its operation.

In the drawings forming part of this specification the separate parts of my improvement are designated by the same numerals of reference in each of the views, and in the practice of my invention I provide a fastening device or clamp which consists of a main link 5, provided at one end with a cross-head 6 and at the other end with a pin or shaft 7, on which is mounted a clamping-plate 8, which is provided at its free end with outwardly-directed shoulders or projections 9, which are adapted to rest upon the sides of the link 5, and the said outer end of the plate 8 is preferably slightly concave, as clearly shown in Fig. 1, and is also preferably provided with serrations or teeth 10. The plate 8 is also provided near its free end with a handle consisting of a ring or eye 11, which is secured thereto, and said plate is provided adjacent to each side thereof with a longitudinal row of perforations or holes 12, three of which are shown in each row, and also with pins or plugs 13, which are adapted to be inserted into said perforations or holes 12 from the under side of the plate and with which is connected a transverse rod or shaft 14, and mounted on said rod or shaft 14 is a yoke 15, which is adapted to turn thereon.

The operation of the device will be readily understood from the foregoing description when taken in connection with the accompanying drawings and the following statement thereof. In practice one end of the line is connected with the yoke 15 and the other end is passed around the cross-head 6, as shown at 16, and by pulling on the end 17 of that part of the line which is passed around the cross-head 6 the said end of the line will be drawn through the clamp or fastening device, as will be readily understood, and in this operation the plate 8 will be forced downwardly thereon, and when said end of the line is released said plate will securely clamp and hold the same.

The shaft or rod 14 may be longitudinally adjustable on the plate 8 or moved forwardly thereon by changing the position of the pins or bolts 13, and this adjustment of the said shaft or rod 14 in the direction of the free end of the plate 8 will increase the leverage of said plate, as will be readily understood, and it will thus be seen that I accomplish the object of my invention by means of a device which is simple in construction and operation and perfectly adapted to accomplish the purpose for which it is intended.

Having fully described my invention, I claim as new and desire to secure by Letters Patent—

A fastening device for lines comprising a link one end of which is provided with a shaft on which is mounted a plate, said plate being approximately as long as said link, and being provided at its free end with shoulders or projections which are adapted to rest on the side of said link, and said plate being provided adjacent to each side thereof with a row of perforations or holes, and pins or plugs which are adapted to enter said perforations or holes, and which support a shaft or rod, and means for connecting a line with said shaft or rod, substantially as shown and described.

In testimony that I claim the foregoing as my invention I have signed my name, in presence of the subscribing witnesses, this 27th day of May, 1897.

WILLIAM H. BOMM.

Witnesses:
C. GERST,
A. C. VAN BLARCOM.